(12) United States Patent
Stevens et al.

(10) Patent No.: US 6,932,423 B2
(45) Date of Patent: Aug. 23, 2005

(54) RELEASABLE HEADER FOR VEHICLE SOFT TOPS

(75) Inventors: Michael C Stevens, Arvada, CO (US); Rick H. Troeger, Westminster, CO (US); James A. Robertson, Thornton, CO (US)

(73) Assignee: Bestop, Inc., Broomfield, CO (US)

( * ) Notice: Subject to any disclaimer, the term of this patent is extended or adjusted under 35 U.S.C. 154(b) by 0 days.

(21) Appl. No.: 10/703,058

(22) Filed: Nov. 6, 2003

(65) Prior Publication Data
US 2004/0130188 A1 Jul. 8, 2004

Related U.S. Application Data
(60) Provisional application No. 60/424,276, filed on Nov. 6, 2002.

(51) Int. Cl.$^7$ ................................. B60J 7/185
(52) U.S. Cl. ................ 296/224; 296/218; 296/121
(58) Field of Search ............... 296/218, 219, 296/121, 224

(56) References Cited

U.S. PATENT DOCUMENTS

| | | | |
|---|---|---|---|
| 1,950,371 A | * | 3/1934 | Baier ..................... 296/219 |
| 3,494,659 A | | 2/1970 | Trenkler |
| 3,666,317 A | | 5/1972 | Podwys |
| D259,340 S | | 5/1981 | Stengel |
| 4,801,173 A | | 1/1989 | Trenkler |
| 4,991,902 A | | 2/1991 | Schrader et al. |
| 5,009,465 A | | 4/1991 | Induni |
| 5,018,783 A | | 5/1991 | Chamings et al. |
| 5,067,768 A | | 11/1991 | Fischbach |
| 5,154,479 A | | 10/1992 | Sautter, Jr. |
| 5,259,658 A | | 11/1993 | Koppenstein et al. |
| 5,267,774 A | | 12/1993 | Garner et al. |
| 5,299,850 A | | 4/1994 | Kaneko et al. |
| 5,667,269 A | | 9/1997 | Prenger et al. |
| 5,884,964 A | | 3/1999 | Roeper et al. |
| 5,947,546 A | | 9/1999 | Hilliard et al. |
| 6,042,174 A | | 3/2000 | Durrani |
| 6,120,087 A | | 9/2000 | Lake |
| 6,199,936 B1 | | 3/2001 | Mac Farland |
| 6,206,450 B1 | | 3/2001 | Ide et al. |
| 6,213,534 B1 | | 4/2001 | Mac Farland |
| 6,338,522 B1 | | 1/2002 | LeBlanc |

FOREIGN PATENT DOCUMENTS

| | | | | |
|---|---|---|---|---|
| AT | 132091 | * | 2/1933 | ................. 296/219 |
| DK | 835 845 | | 7/1949 | |
| FR | 848078 | * | 10/1939 | ................. 296/219 |
| FR | 2263120 | * | 11/1975 | ................. 296/219 |
| IT | 371554 | | 3/1939 | |

OTHER PUBLICATIONS

Assembly instruction sheets for part numbers header 51206 and top 52542, header 51210 and top 52530, and header 51238 and top 52528 of Bestop, Inc. c. 2003.

* cited by examiner

Primary Examiner—Dennis H. Pedder
(74) Attorney, Agent, or Firm—W. Scott Carson

(57) ABSTRACT

A removable header for a soft top or similar accessory for a sport utility vehicle. The header has a main body that is releasably securable to the vehicle windshield using just clamps. The header also includes short extensions on each side of the main body that extend rearwardly of it. In use, the extensions abut portions of the safety bar arrangement immediately adjacent the windshield of the vehicle and prevent the header from rotating beyond a predetermined position relative to the windshield.

18 Claims, 7 Drawing Sheets

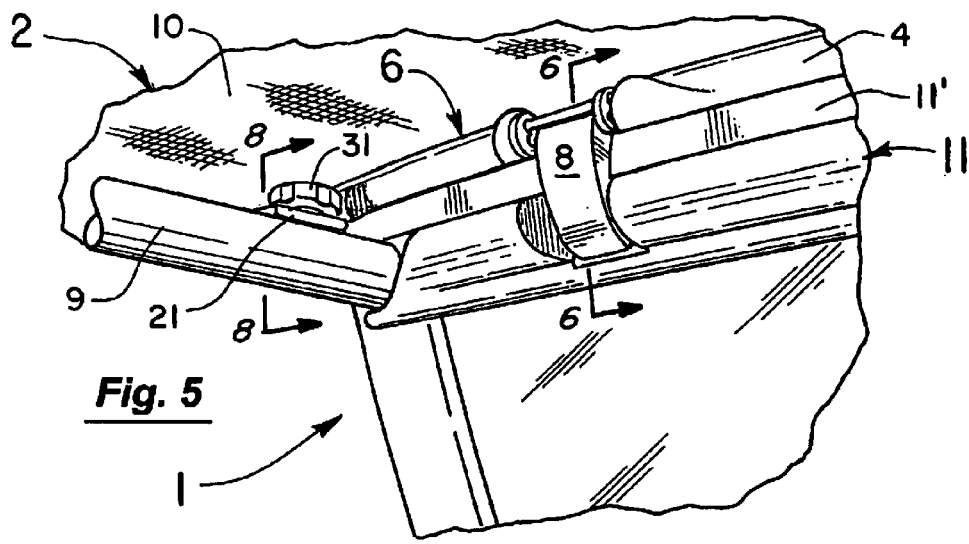
Fig. 5
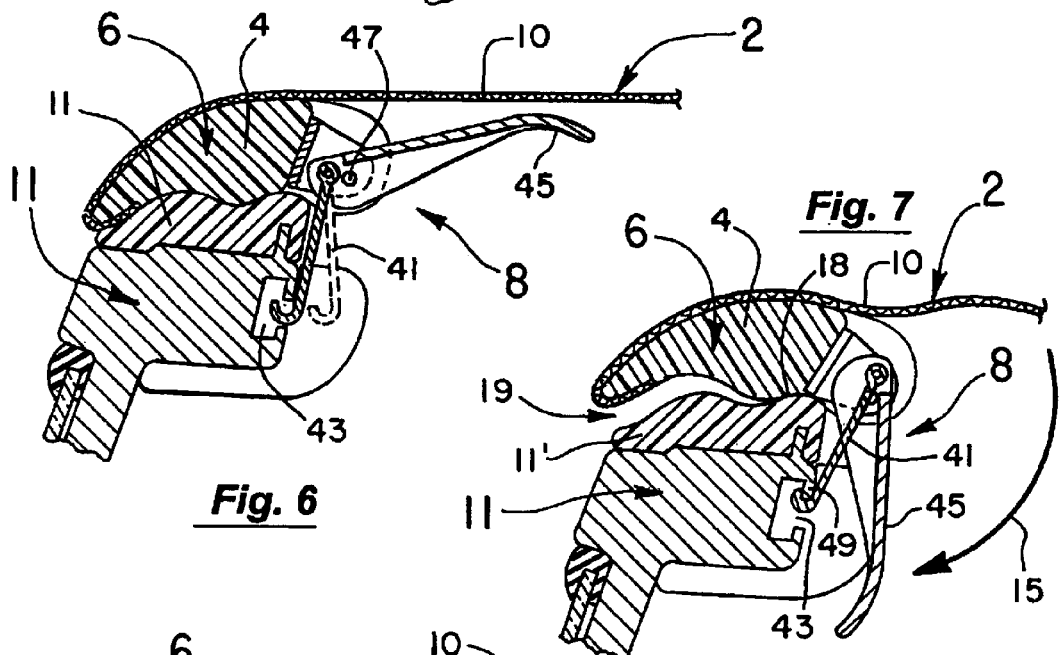
Fig. 6
Fig. 7
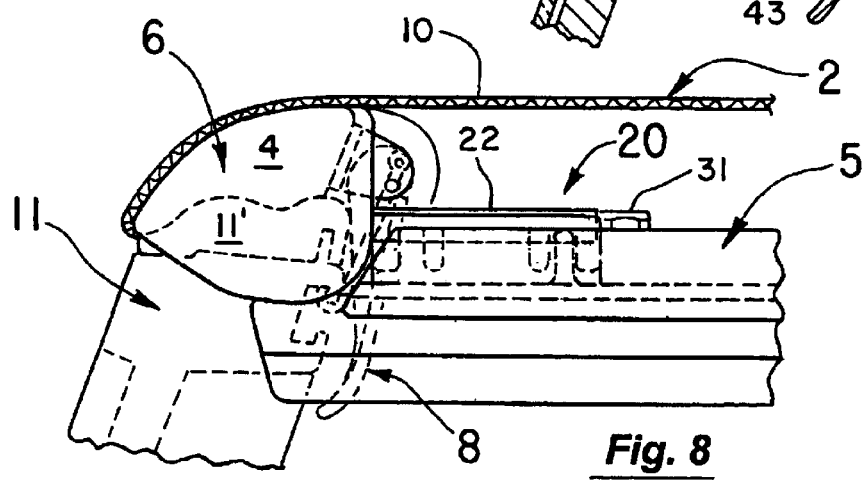
Fig. 8

RELEASABLE HEADER FOR VEHICLE SOFT TOPS

RELATED APPLICATIONS

This application claims the benefit of U.S. Provisional Patent Application Ser. No. 60/424,276 filed Nov. 6, 2002, which is incorporated herein by reference.

BACKGROUND OF THE INVENTION

1. Field of the Invention

This invention relates to the field of releasable headers for vehicle soft tops and more particularly to the field of releasable headers with structure to prevent undesirable rotation of the header relative to the vehicle windshield.

2. Discussion of the Background.

Soft tops and other accessories which are removably securable to the windshield of sport utility vehicles come in a wide variety of designs. In one of the more common designs, the soft top or other accessories has an integral header that is releasably attachable to the windshield of the vehicle. In a second common design, the header is essentially permanently attached to the windshield and the top or other accessories is then removably secured to the header.

U.S. Pat. No. 5,947,546 is an example of the first type of design. In it, the soft top of FIG. 8 has its own header 100 that is releasably securable to the windshield 32 by clamps (see also its FIGS. 12–13). In this first type, the clamps can be either fixed to the header itself as in U.S. Pat. No. 5,947,546 or fixed to the windshield as in U.S. Pat. No. 5,299,850 at FIGS. 8 and 11. In the second type of design, the header and top are separate parts. The header is then removably attached (or permanently attached) to the windshield and the front of the soft top or other accessory is removably secured to the header by snaps, belts, or similar means. The rear of the top is then tied or otherwise removably secured to the vehicle.

With the first type, it is possible to use only clamps or latches to releasably secure the header to the windshield. This is very commercially advantageous because the vehicle owner does not have to use any other parts or tools to attach/remove the header and no extra holes must be drilled in the original equipment windshield. However, with current headers for the second type, attachments more elaborate than clamps alone are normally necessary. These more elaborate attachments nearly always involve drilling additional holes in the windshield (beyond those normally provided by the vehicle manufacturer to receive clamps) and using bolts and other parts that require tools to attach/remove the header. The reason that such attachments beyond or in addition to clamps are necessary in the second type is that most clamps by themselves create a torque on the header that tends to rotate it downwardly into the cabin of the vehicle. This can separate and create a crack or space between the header and windshield that not only is unsightly (e.g., the top attached to the header can have a noticeable dip or slack in it) but also can leak water, air, and dust into the cabin. Additionally, as the vehicle is driven, the loose top tends to flutter and the leaking air tends to creates an annoying whistle in the vehicle cabin.

The first type of header design can be attached to the windshield using clamps alone because the top is also secured to a folding frame that in turn is secured to the vehicle (see U.S. Pat. Nos. 5,947,546 and 5,299,850). In particular, the leg 106 of the folding frame in FIG. 7 of U.S. Pat. No. 5,947,546 is rigidly attached to the header 100 and pivotally secured to the vehicle at pivot 120 (see FIGS. 4 and 7). This attachment of the header 100 to the frame is stiff enough that it counters any rotational forces applied to the header 100 by the clamps. Similarly, the leg 15 in FIG. 8 of U.S. Pat. No. 5,299,850 is fixedly attached to the vehicle by a pivot on the drip rail just above the door. In contrast, with the second type of design, there is no such frame to counter the rotational forces of the clamps on the header as there is just the header and the fabric of the soft top attached to it (i.e., no frame). The challenge then arises to design a frameless soft top with its own, integral header that can be releasably secured to the windshield just by clamps yet not have the rotation problems of existing headers.

With this and other problems in mind, the present invention was developed. In it, structure is provided on the releasable header of a frameless soft top to counter any tendency of the header to undesirably rotate when it is clamped to the windshield of the vehicle.

SUMMARY OF THE INVENTION

This invention involves a releasable header for a soft top or similar accessory for a sport utility vehicle. The header has a main body that is releasably securable to the vehicle windshield using just clamps. The header also includes short extensions on each side of the main body that extend rearwardly of it. In use, the extensions abut portions of the safety bar arrangement immediately adjacent the windshield of the vehicle and prevent the header from rotating beyond a predetermined position relative to the windshield.

In one embodiment, the extensions abut the upper section of a door rail which is attached to a horizontal member of the safety bar arrangement. In a second embodiment, the extensions abut a prong adaptor attached to the horizontal member. With both embodiments, the header and attached soft top can be removably secured as a unit to the windshield by clamps alone for ease of operation without the need for any additional parts or tools.

BRIEF DESCRIPTION OF THE DRAWINGS

FIG. 5 is a view essentially from the driver's seat looking up at the front left corner of the vehicle showing one of the clamps used to secure the soft top header to the vehicle windshield.

FIG. 6 is a view taken along line 6—6 of FIGS. 4 and 5 but showing the clamp in its open position initially engaging the windshield.

FIG. 7 is a view similar to FIG. 6 showing the undesirable rotation of the header relative to the vehicle windshield that can occur due to the operation of the clamps if the anti-rotation feature of the invention is not present.

FIG. 8 is a view taken along line 8—8 of FIGS. 4 and 5 showing the operation of the present invention to prevent the undesirable rotation of FIG. 7.

DETAILED DESCRIPTION OF THE INVENTION

Figure 1:
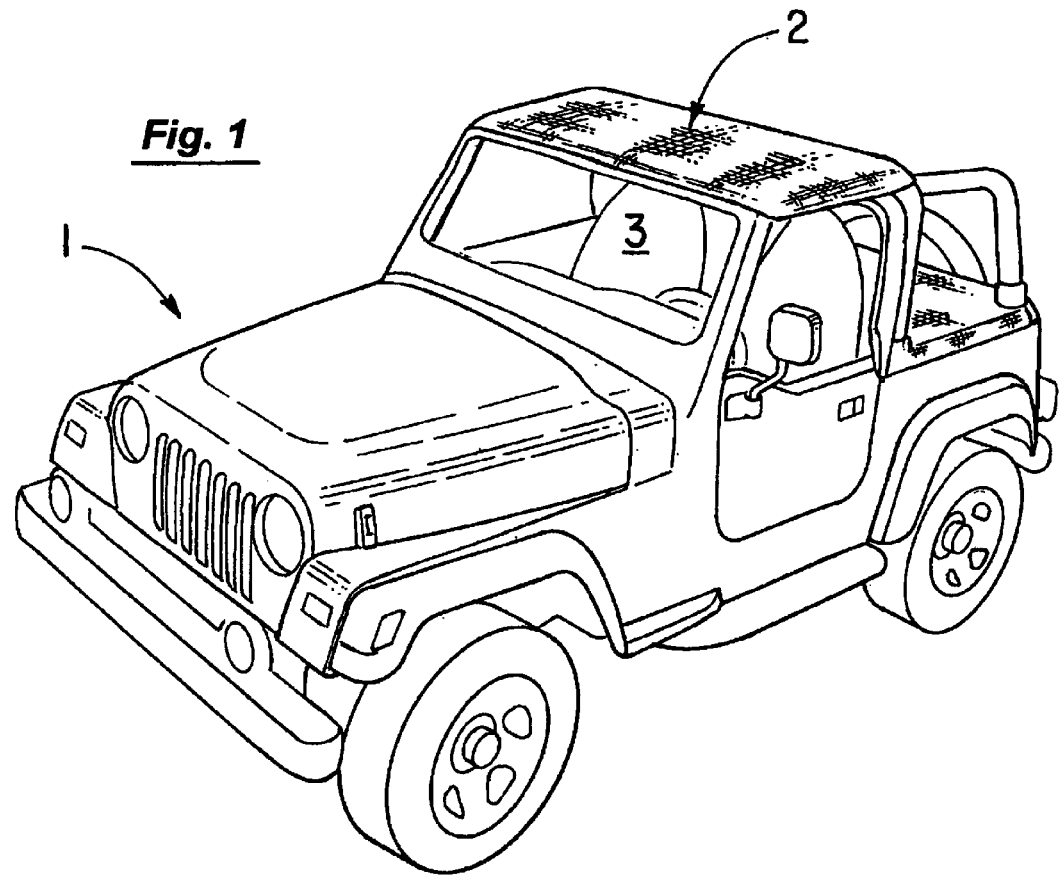
FIG. 1 is a perspective view of a sport utility vehicle with a soft top according to the present invention covering the cabin.
Figure 2:
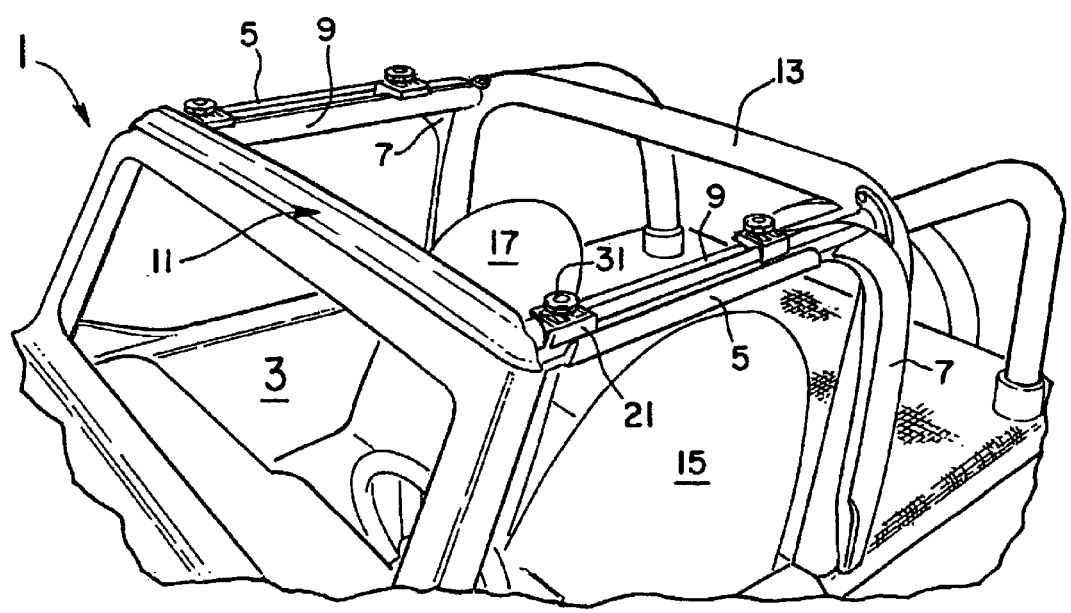
FIG. 2 is an enlarged, perspective view similar to FIG. 1 with the soft top removed.
Figure 3:
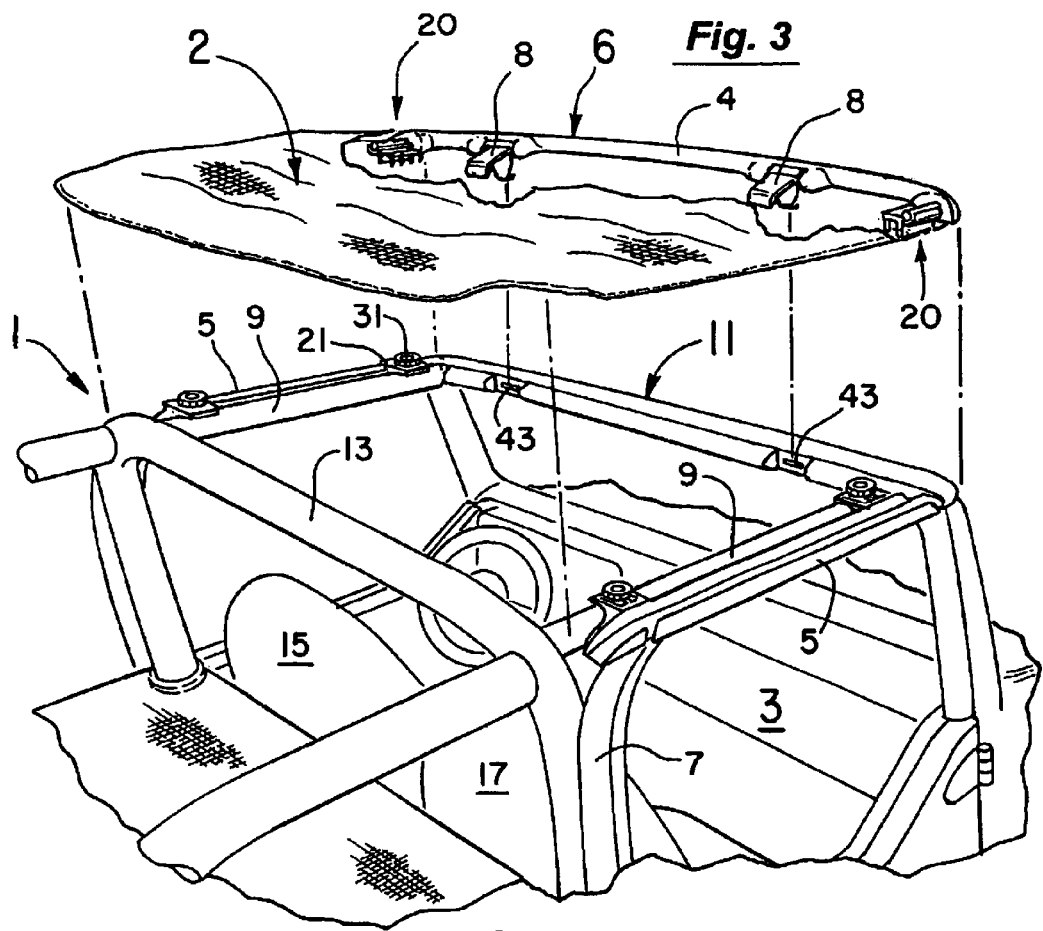
FIG. 3 is an exploded view of the soft top and vehicle.
Figure 4:
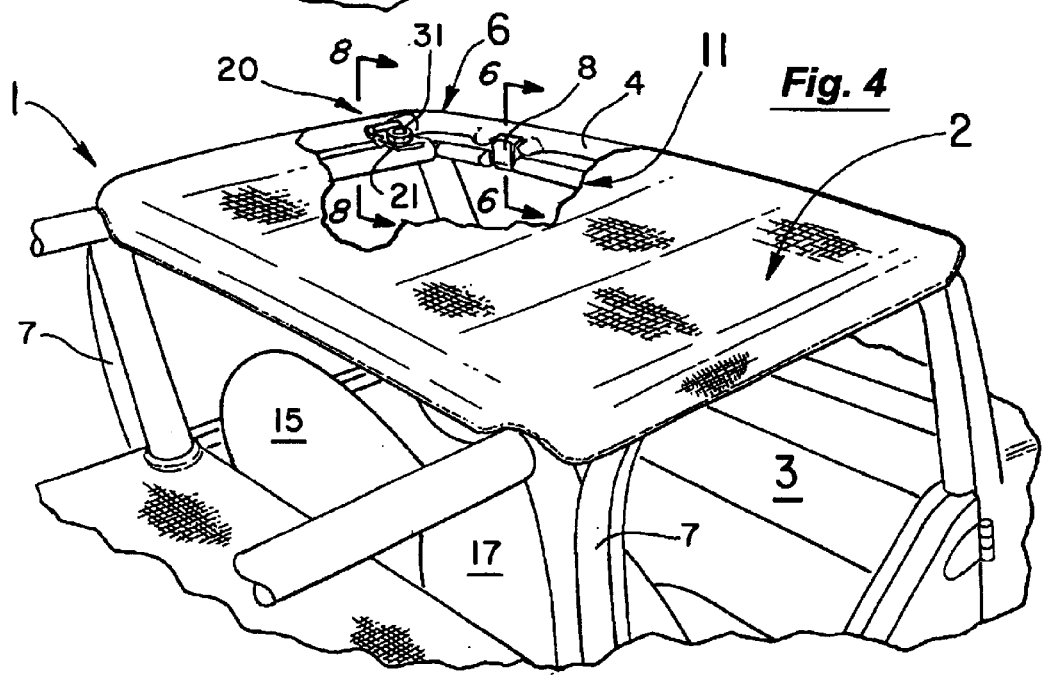
FIG. 4 is a view similar to FIG. 3 with the soft top shown in its secured position on the vehicle.

FIG. 1 illustrates the vehicle 1 with a soft top 2 according to the present invention secured thereto over the cabin area 3. In FIG. 2, the soft top 2 has been removed to show the equipment under the soft top 2 that commonly is available with the vehicle 1. This equipment includes the door rails on each side of the vehicle 1 that have upper, substantially horizontal sections 5 and rear, substantially vertical sections 7. The upper sections 5 as shown in FIG. 2 are mounted on and essentially become part of each horizontal bar or member 9 of the safety bar arrangement. The vertical sections 7 then extend downwardly from horizontal sections 5 to the body of the vehicle 1. In use as shown in FIGS. 3 and 4, the soft top 2 can be removably secured in place over the cabin area 3 (see FIG. 4). In the position of FIG. 4, the illustrated soft top 2 extends from side-to-side between the upper sections 5 of the door rails of FIG. 3 and from front-to-back between the vehicle windshield 11 and the horizontal bar or member 13 of the safety bar arrangement. The member 13 in this regard is immediately behind the driver's and front passenger's seats 15 and 17. In mounting the soft top 2 on the vehicle 1 as seen in FIGS. 3–5, the main body 4 of the header 6 of the soft top 2 is releasably secured by clamp or latch assemblies 8 to the vehicle windshield 11.

In a frameless top such as 2 which essentially includes only the header 6 to which the fabric 10 is attached (e.g., by screws, snaps, or adhesives), a rotation problem can arise as illustrated in FIGS. 6 and 7. This problem can occur because the clamp assemblies 8 used to releasably secure the header 6 to the vehicle windshield 11 create a torque force 15 (see FIG. 7) tending to lift or rotate the main body 4 of the header 6 relative to the windshield 11 and its sealing cap 11'. This rotation is generally about an axis or location 18 (see FIG. 7) and not only can compromise the seal between the main body 4 of the header 6 and the windshield cap 11' but also may even cause a distinct separation or crack to appear such as 19 in FIG. 7. The resulting drawbacks of such rotation (even if only slight) can be quite significant from both an appearance standpoint and a structural one. As for example, the rotation tends to create an undesirable dip and looseness in the fabric portion 10 of the top 2. This can greatly detract from the desired neat and taut appearance of the top 2. Additionally, this looseness or slack as in FIG. 7 can cause the fabric 10 to flutter when the vehicle 1 is driven creating undesirable cabin noise. Structurally as previously mentioned, the rotation of the header 6 in FIG. 7 can compromise the normal seal between the main body 4 of the header 6 and the sealing cap 11' of the windshield 11. This in turn can allow water, dust, and air to enter the cabin onto the occupants in as well as create whistling noises when the vehicle 1 is driven.

To counter this rotation problem, the present invention was developed. With it, short extensions 20 are provided on each end of the main body 4 of the header 6 (see FIGS. 8–10). The extension arrangements 20 can have any number of functionally equivalent designs but in the illustrated one of FIGS. 8–10, each extension arrangement 20 has a tubular member 22 and attached block 24. This particular design is intended to abut against the upper door rail section 5 of currently available equipment at the nut 21 that attaches section 5 to the horizontal bar 9 (see also FIG. 13). When attached to the bar or member 9, the door rail section 5 as mentioned above essentially become part of the safety bar arrangement in the sense that the section 5 and bar 9 are integrally joined. Each extension arrangement 20 on the ends of the main body 4 of the header 6 then serves to abut this horizontally extending portion 5 and 9 of the safety bar arrangement.

Figure 9:
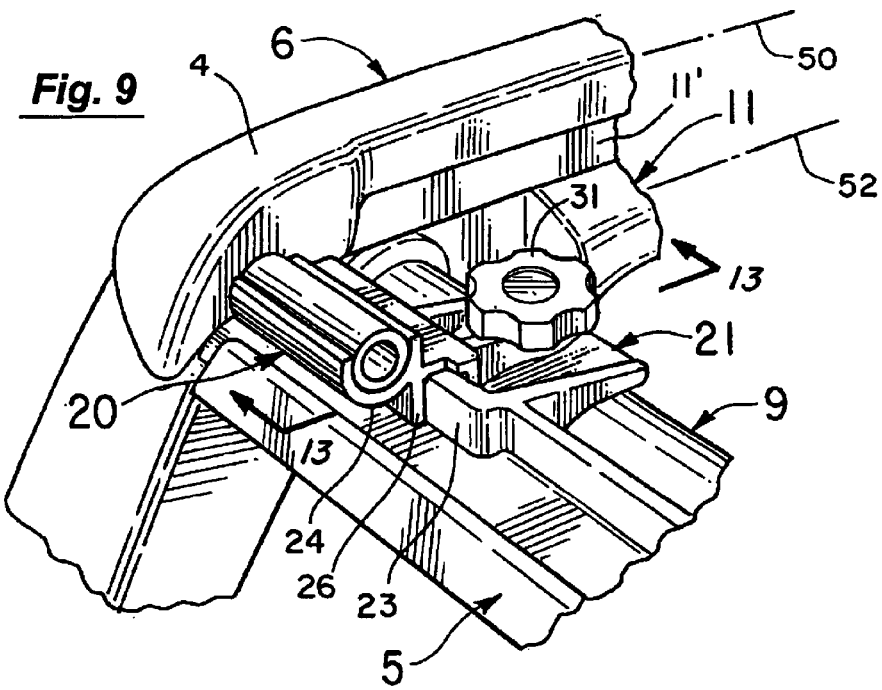
FIG. 9 is a perspective view of the corner area of FIGS. 4 and 5 with the fabric of the soft top removed for clarity.
Figure 10:
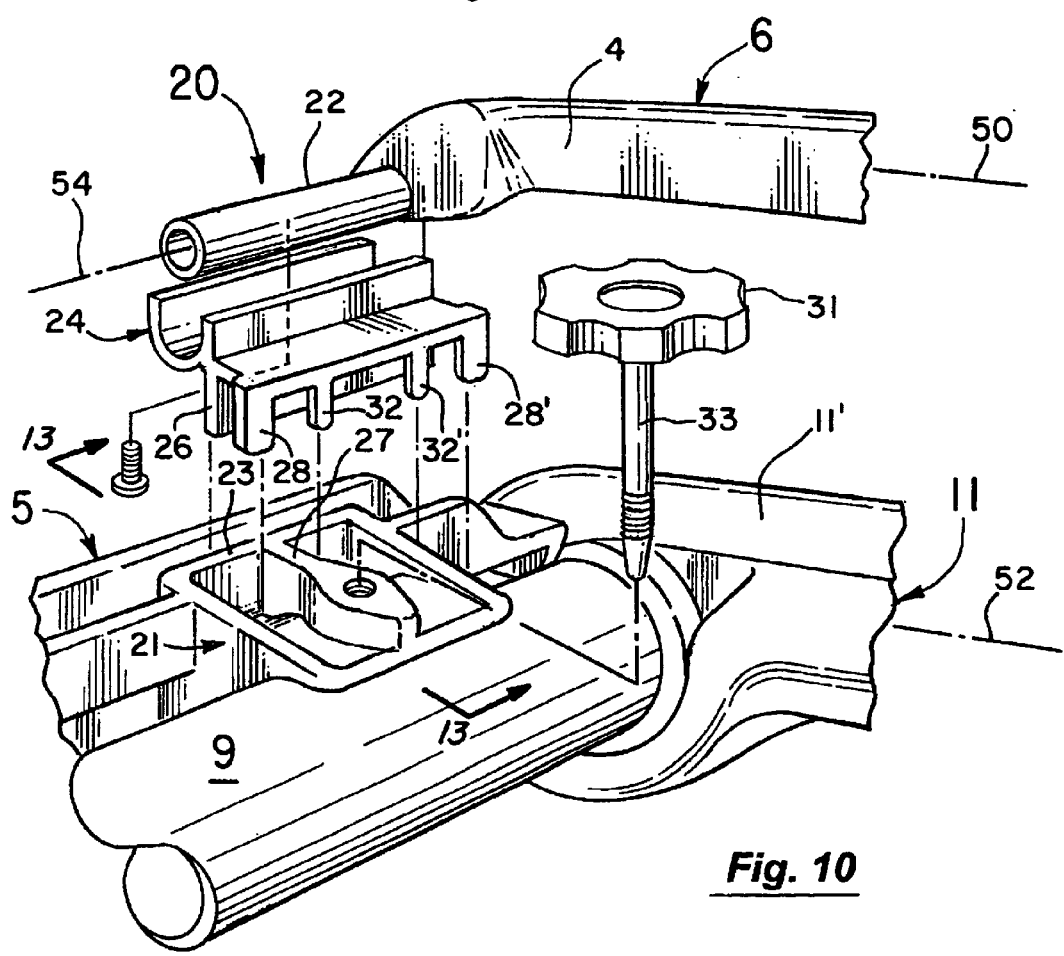
FIG. 10 is an exploded, perspective view of the corner area of FIG. 9.

More specifically as perhaps best seen in FIGS. 9 and 10, the block 24 of the extension arrangement 20 fits snugly against and into the nut 21 of the door rail section 5. In this manner, the header 6 of the soft top 2 can be positioned as in FIG. 6 and the clamp assemblies 8 manually operated to secure the main body 4 of the header 6 in place against the vehicle windshield 11. However, and instead of this clamping causing the undesirable rotation of the main body 4 of the header 6 relative to the windshield 11 as in FIG. 7, the extension arrangements 20 serve to counter the torque force 15 in FIG. 7 and prevent this undesirable rotation. The soft top 2 is then secured in place as in FIG. 8 with the main body 4 of the header 6 abutting the sealing cap 11' of the windshield 11 and the fabric 10 of the top 2 in the desired, taut position of FIG. 8.

Figure 11:
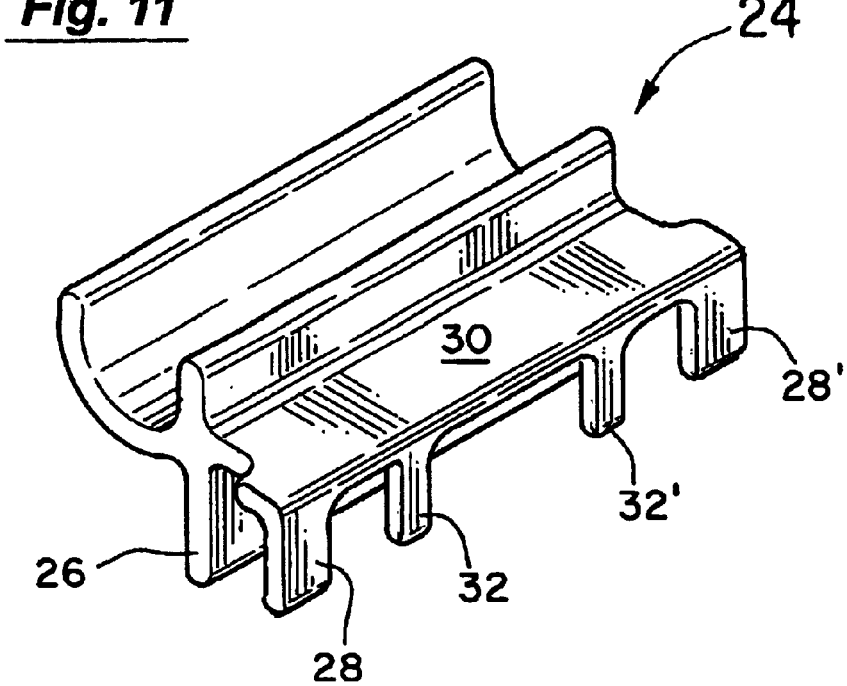
FIGS. 11 and 12 are enlarged, perspective views of the block member of FIG. 10.
Figure 12:
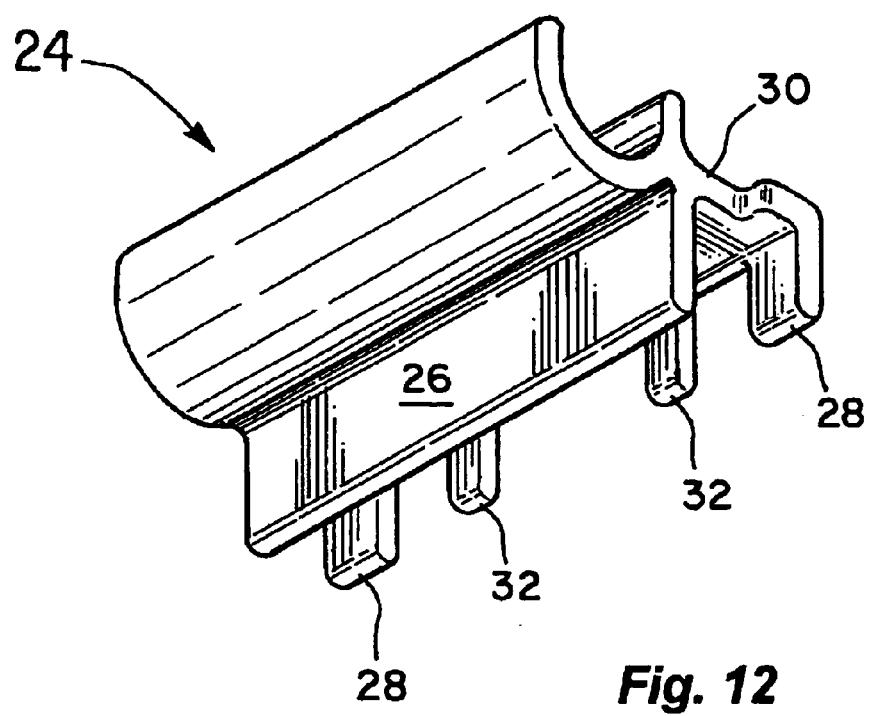
Figure 13:
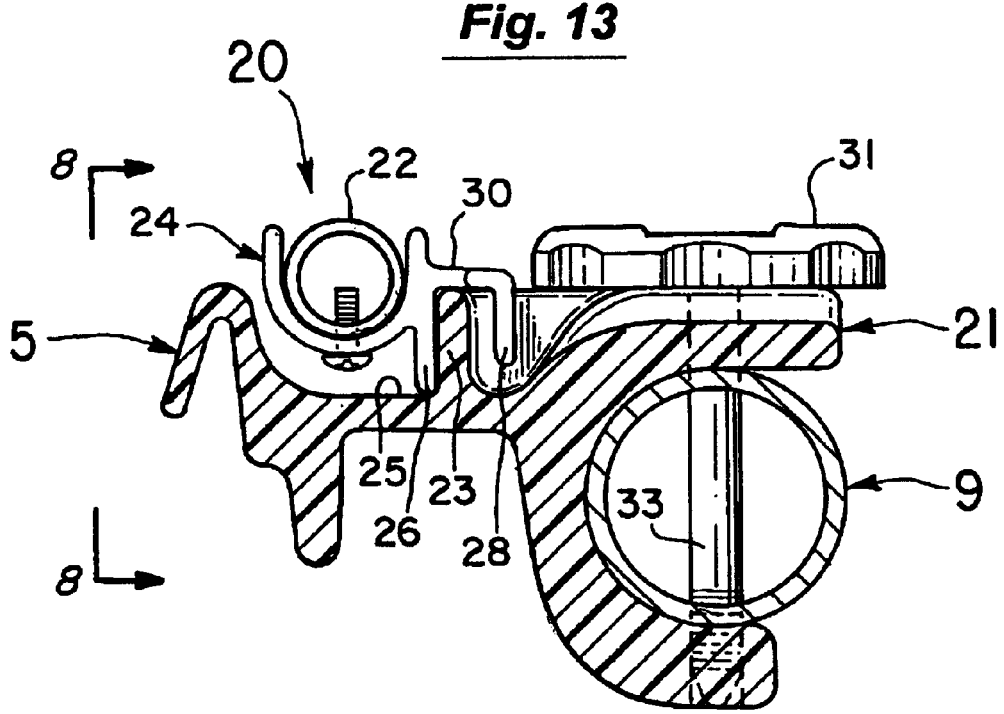
FIG. 13 is a view taken along line 13—13 of FIG. 9.

To accomplish this as best seen in FIGS. 9, 10, and 13, the block 24 of the extension 20 is provided with depending leg members 26 and 28 (see FIGS. 10 and 13). These legs 26 and 28 as illustrated straddle the upstanding wall 23 of the commercially available door rail nut 21. In doing so (see FIG. 13), the crosspiece 30 of the block 24 between the legs 26 and 28 preferably abuts the top of the wall 23. The leg 26 can also be dimensioned if desired to abut the drip channel 25 of the door rail section 5 as also illustrated in FIG. 13. The dimensions of the extension arrangement 20 in this regard are gauged so that the abutment of the crosspiece 30 and/or leg 26 occurs to prevent the main body 4 of the header 6 from moving beyond the desired location of FIG. 8. In essence, the extension arrangements 20 cooperating with the door rail section 5 on the bar 9 provide a counter force to the torque 15 of FIG. 7. This counter force then prevents the header 6 from moving beyond the predetermined, desired location or position of FIG. 8. It is noted that the straddling of the nut wall 23 by legs 26 and 28 of the block 24 (see FIG. 13) also helps to center the extension 20 from side-to-side relative to the door rail section 5 and to center the main body 4 of the header 6 relative to the windshield 11. Depending leg 32 (see again FIG. 10) in conjunction with leg 28 additionally aids in aligning the block 24 from front-to-back with the door rail nut 21 by straddling the interior wall 27 of the nut 21. This straddling could be of other parts of the door rail section 5 but the walls 23 and 23 are preferred. It is further noted that the block 24 is preferably symmetrical as illustrated in FIGS. 10–12 so that the same block design can be used on either the left or right side of the header 6. That is and in a mirror image manner, the right or opposite side extension 20 from the one shown in FIG. 10 would have the legs 26, 28', and 32' operating in the fashion of legs 26, 28, and 32 of FIG. 10.

Figure 14:
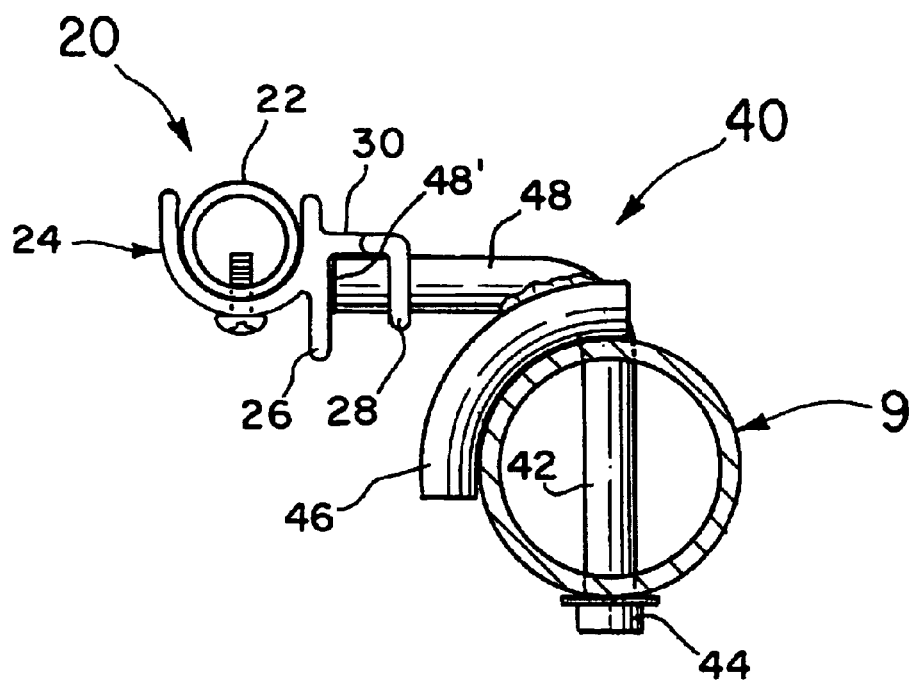
FIG. 14 is a view similar to FIG. 13 showing the extension arrangement of the header of the present invention engaging a prong adaptor on the horizontal bar rather than the door rail of FIG. 13.
Figure 15:
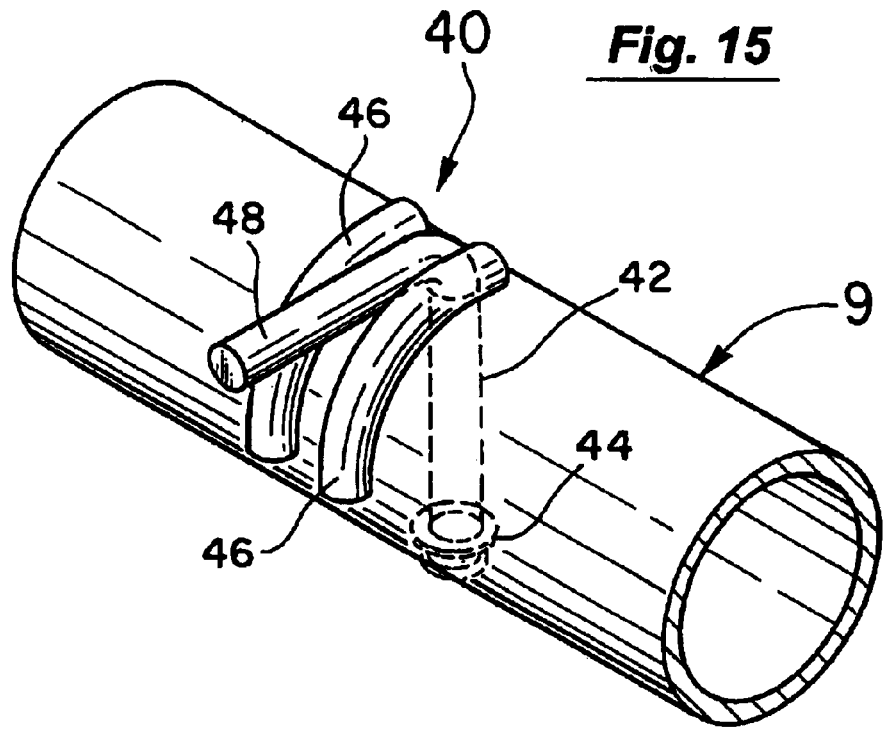
FIG. 15 is a perspective view of the prong adaptor attached to the horizontal member of the safety bar arrangement.
Figure 16:
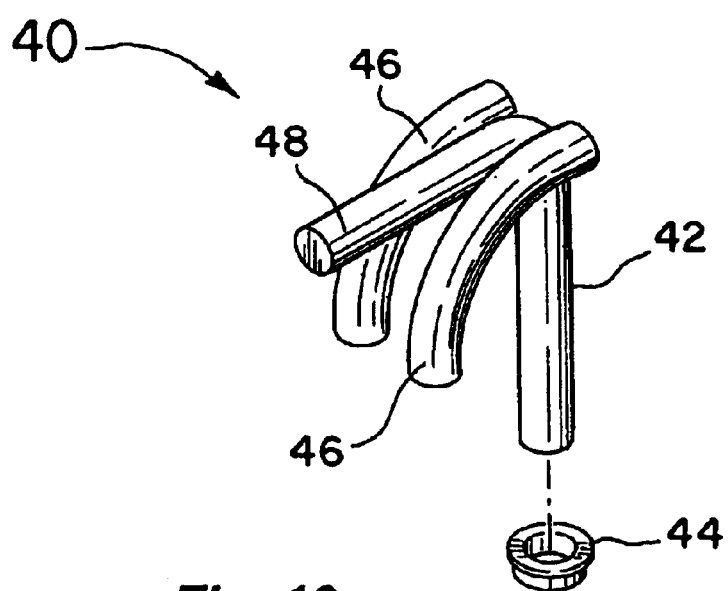
FIG. 16 is a view of the prong adaptor itself.

As mentioned above, the door rail sections 5 and 7 are commercially available for the vehicle 1 and are often provided as original equipment when a soft top such as 2 is purchased with the vehicle 1. However, such sections 5 and 7 are removable as illustrated in FIGS. 10 and 13 by unscrewing the knob 31 of the threaded bolt 33 holding the section 5 at nut 21 in place on the bar 9. Additionally, vehicles like 1 are also commercially available from the manufacturer without the door rail sections 5 and 7 as an accessory. When a door rail section or adaptor like 5 is not structurally present as a part or portion of the safety bar arrangement, a prong adaptor such as 40 in FIGS. 14–16 can be used to provide an abutment or anchor for the extension arrangements 20. This adaptor can be of any number of designs including the illustrated one which has a central member 42 passing through the bar 9 and attached thereto by tap nut 44. The adaptor additionally includes the two curved side legs 46 (see FIGS. 15–16)and the protruding leg 48. Like the door rail section 5 of FIG. 13, the prong adaptor 40 in FIG. 14 is integrally joined to the bar 9 and essentially becomes part of the safety bar arrangement. Also, like the door rail section 5 of FIG. 13, the protruding leg member 48 of the prong arrangement 40 acts as an abutment or anchor against the crosspiece 30 of the extension 20 (see again FIG. 14). In this manner, the protruding leg member 48 prevents any undesired rotation of the header 6 past the desired position of FIG. 8. Additionally, the free end 48' of the protruding leg 48 as illustrated in FIG. 14 preferably abuts the vertical leg 26 of the block 24 to aid in properly positioning the header 6 from side-to-side on the windshield 11. In a manner like the block 24 and nut 21 in FIG. 10, the legs 28 and 32 also straddle the leg 48 in a front-to-back direction to further aid in properly aligning the header 6 relative to the windshield 11.

It is noted that the illustrated clamping or latching assembly 8 in FIGS. 6 and 7 is a common, commercially available design. In it, the hook member 41 is received in the slot 43 in the windshield 11. Rotation of the handle member 45 about the axis 47 as illustrated in FIGS. 6 and 7 will then draw the hook member 41 into engagement with the upper edge 49 defining the slot 43 (see FIG. 7). The anti-rotation extensions 20 of the present invention as mentioned above were designed with these commercially available clamp assemblies in mind but would obviously work with any attaching arrangement that tended to create a rotation of the main body 4 of the header 6 relative to the windshield 11. This would include clamps affixed to the windshield 11 rather than to the header 6 as in the illustrated embodiments. Regardless, the anti-rotation feature of the header 6 of the present invention will offer a way to secure a header to the windshield 11 such as in FIG. 8 using clamps alone without the need to bolt or otherwise additionally attach the header to the windshield. The header can then be put on and taken off the windshield by simple operation of manual clamps without the need for any tools or other parts.

Once removed, the soft top 2 including the integral header 6 can be conveniently stored in the rear of the vehicle 1 or at a remote location. As mentioned above, the header 6 is preferably an integral part of the soft top 2 or similar accessory so it can be very easily and quickly placed on the vehicle 1. To accomplish this as also discussed above, the main body 4 of the header 6 need only be first placed adjacent the windshield 11 with the respective axes 50 and 52 substantially parallel as in FIGS. 9 and 10. The clamp assemblies 8 of FIGS. 3–8 can then be manually closed to draw the main body 4 of the header 6 and the windshield 11 together. In doing so, each extension arrangement 20 will abut against the safety bar portion of 5 and 9 in FIGS. 1–13 (or safety bar portion of 40 and 9 in FIGS. 14–16) to prevent any undesirable rotation of the header 6 beyond the desired location of FIG. 8. Each extension arrangement 20 in this regard extends rearwardly of the main body 4 generally along an axis 54 perpendicular the axis 50 of the main body 4 (see FIG. 10). In abutting the safety bar portion of 5 and 9 (or the portion of 40 and 9), it is noted that each extension 20 need only extend rearwardly a relatively small distance. The abutting of the extension 20 adjacent its free end then occurs substantially closer to the windshield 11 than to the rear of the respective safety bar portions (e.g., such as 5 and 9 at the lateral crossbar 13 in FIGS. 2–4). The abutment of the extension arrangements 20 is thus much closer to the front location of the safety bar portion 5, 9 near the windshield 11 than to the back location of the portion 5, 9 adjacent the rear of the driver's seat 15 and front passenger's seat 17.

While several embodiments of the present invention have been shown and described in detail, it to be understood that various changes and modifications could be made without departing from the scope of the invention.

We claim:

1. A top arrangement to removably secure a soft top to the windshield of a vehicle, said soft top having a fabric portion attached to a header, said windshield extending along a first axis and said vehicle further including a safety bar arrangement with a substantially horizontal portion thereof on each side of the vehicle respectively extending rearwardly from the windshield, said header having a main body extending along a second axis, said header being selectively movable between at least first and second positions, said header in said first position being releasably secured to said windshield by at least one clamping assembly with said first and second axes substantially parallel, said clamping assembly generating a torque force tending to rotate said header from said first position about a rotation axis, said header further including at least one extension arrangement attached to and extending rearwardly of the main body of the header, said extension arrangement abutting against at least one of the safety bar portions immediately adjacent the windshield with said header in said first position secured to said windshield to counter the torque force and prevent the rotation of the header beyond a predetermined location about said rotational axis, said header in said second position being released from and spaced from said windshield with said attached extension arrangement spaced from engagement with said one safety bar portion.

2. The top arrangement of claim 1 wherein said safety bar portions respectively extend rearwardly of the windshield from a first location adjacent the windshield to a second location respectively adjacent the rear of the driver's seat and the front passenger's seat and said extension arrangement abuts at least one of said safety bar portions between said first and second locations.

3. The top arrangement of claim 2 wherein said extension arrangement abuts said at least one safety bar portion substantially closer to said first location than to said second location.

4. The top arrangement of claim 1 wherein said safety bar portion includes a bar and a door rail section attached thereto and said extension arrangement abuts said door rail section of said safety bar portion.

5. The top arrangement of claim 4 wherein said extension arrangement further includes leg members straddling a part of said door rail section to aid in aligning said header from side-to-side relative to the windshield.

6. A top arrangement to removably secure a soft top to the windshield of a vehicle, said soft top having a fabric portion attached to a header, said windshield extending along a first axis and said vehicle further including a safety bar arrangement with a substantially horizontal portion thereof on each side of the vehicle respectively extending rearwardly from the windshield, said header having a main body extending along a second axis, said header being positionable adjacent said windshield with said first and second axes substantially parallel, said header being releasably securable to said windshield by at least one clamping assembly, said clamping assembly generating a torque force tending to rotate said header about a rotation axis, said header further including at least one extension arrangement extending rearwardly of the main body of the header to abut against at least one of the safety bar portions immediately adjacent the windshield to counter the torque force and prevent the rotation of the header beyond a predetermined location about said rotational axis, said safety bar portion including a bar and a door rail section attached thereto and said extension arrangement abuts said door rail section of said safety bar portion wherein said extension arrangement further includes leg members straddling a part of said door rail section to aid in aligning said header from front-to-back relative to the windshield.

7. The top arrangement of claim 1 wherein said safety bar portion includes an adaptor attached thereto and said extension arrangement abuts said adaptor of said safety bar portion.

8. The top arrangement of claim 7 wherein said adaptor is a door rail section.

9. The top arrangement of claim 7 wherein said adaptor is a prong arrangement having a protruding leg member.

10. A top arrangement to removably secure a soft top to the windshield of a vehicle, said soft top having a fabric portion attached to a header, said windshield extending along a first axis and said vehicle further including a safety bar arrangement with a substantially horizontal portion thereof on each side of the vehicle respectively extending rearwardly from the windshield, said header having a main body extending along a second axis, said header being positionable adjacent said windshield with said first and second axes substantially parallel, said header being releasably securable to said windshield by at least one clamping assembly, said clamping assembly generating a torque force tending to rotate said header about a rotation axis, said header further including at least one extension arrangement extending rearwardly of the main body of the header to abut against at least one of the safety bar portions immediately adjacent the windshield to counter the torque force and prevent the rotation of the header beyond a predetermined location about said rotational axis, said safety bar portion including an adaptor attached thereto and said extension arrangement abuts said adaptor of said safety bar portion wherein said extension arrangement further includes leg members straddling a part of said adaptor to aid in aligning said header from side-to-side relative to the windshield.

11. A top arrangement to removably secure a soft top to the windshield of a vehicle, said soft top having a fabric portion attached to a header, said windshield extending along a first axis and said vehicle further including a safety bar arrangement with a substantially horizontal portion thereof on each side of the vehicle respectively extending rearwardly from the windshield, said header having a main body extending along a second axis, said header being positionable adjacent said windshield with said first and second axes substantially parallel, said header being releasably securable to said windshield by at least one clamping assembly, said clamping assembly generating a torque force tending to rotate said header about a rotation axis, said header further including at least one extension arrangement extending rearwardly of the main body of the header to abut against at least one of the safety bar portions immediately adjacent the windshield to counter the torque force and prevent the rotation of the header beyond a predetermined location about said rotational axis, said safety bar portion including an adaptor attached thereto and said extension arrangement abuts said adaptor of said safety bar portion wherein said extension arrangement further includes leg members straddling a part of said adaptor to aid in aligning said header from front-to-back relative to the windshield.

12. The top arrangement of claim 1 wherein said extension arrangement has a free end spaced from the main body of said header.

13. The top arrangement of claim 12 wherein said extension arrangement abuts said safety bar portion adjacent the free end thereof.

14. The top arrangement of claim 1 wherein said extension arrangement extends rearwardly from the main body of the header along an axis substantially perpendicular to the second axis.

15. The top arrangement of claim 1 wherein said clamp assembly is affixed to the main body of the header and includes a hook member receivable in a slot adjacent said windshield to secure the header to the windshield.

16. The top arrangement of claim 4 wherein said extension arrangement further includes leg members straddling a part of said door rail section to aid in aligning said header from front-to-back relative to the windshield.

17. The top arrangement of claim 7 wherein said extension arrangement further includes leg members straddling a part of said adaptor to aid in aligning said header from side-to-side relative to the windshield.

18. The top arrangement of claim 7 wherein said extension arrangement further includes leg members straddling a part of said adaptor to aid in aligning said header from front-to-back relative to the windshield.

* * * * *